United States Patent [19]

Gupta

[11] Patent Number: 5,319,023

[45] Date of Patent: * Jun. 7, 1994

[54] OPTICAL LENSES, HAPTICS THEREFOR AND OPTICAL LENS BODIES HAVING HAPTICS

[75] Inventor: Amitava Gupta, Pasadena, Calif.

[73] Assignee: Ioptex Research Inc., Aruza, Calif.

[*] Notice: The portion of the term of this patent subsequent to Dec. 28, 2010 has been disclaimed.

[21] Appl. No.: 905,991

[22] Filed: Jun. 26, 1992

Related U.S. Application Data

[63] Continuation of Ser. No. 713,572, Jun. 11, 1991, abandoned, which is a continuation of Ser. No. 289,926, Dec. 23, 1988, abandoned, which is a continuation-in-part of Ser. No. 118,300, Nov. 9, 1987, abandoned.

[51] Int. Cl.$^5$ ............................................... C08F 8/00
[52] U.S. Cl. ..................................... 525/100; 525/102
[58] Field of Search ................................ 525/100, 102

[56] References Cited

U.S. PATENT DOCUMENTS

| | | | |
|---|---|---|---|
| 4,605,712 | 8/1986 | Mueller et al. | 525/100 |
| 4,611,892 | 9/1986 | Kawashima et al. | 350/165 |
| 4,613,380 | 9/1986 | Chen | 134/26 |

FOREIGN PATENT DOCUMENTS 0068800  1/1983  European Pat. Off. .

*Primary Examiner*—Bernard Lipman
*Attorney, Agent, or Firm*—Rosenman & Colin

[57] ABSTRACT

Optical lens bodies and haptics therefore are prepared from polymeric materials wherein all surfaces of the materials are substantially biologically inert to occular tissue, all surfaces are substantially free of surface defects when viewed through a 10 power optical microscope, the materials have a contact angle with water of at least 85°, a contact angle with glycerol of least 75° and a surface energy less than 30 erg/cm$^2$.

26 Claims, No Drawings

OPTICAL LENSES, HAPTICS THEREFOR AND OPTICAL LENS BODIES HAVING HAPTICS

This is a continuation of Ser. No. 713,572, filed Jun. 11, 1991, which was a continuation of Ser. No. 289,926, filed Dec. 23, 1988, which was a continuation-in-part of my application Ser. No. 118,300 filed Nov. 9, 1987, all now abandoned.

In that application, I described a procedure for modifying the surface of various polymeric materials in order to "surface passivate" them. The technique of surface passivation presents a substantial advance in the art as it renders polymeric materials substantially biologically inert to occular tissue, renders the surfaces substantially free of surface defects and makes them generally more biocompatible with the human or animal utilizing such a lens. In my earlier application, I described various theories as to why the surface of polymeric materials was able to be modified to exhibit such properties without leaving a deposition of any material on the surface.

I have now discovered that the essential characteristics which my surface passivated materials should exhibit in order to achieve the advantages described in my original patent application are also exhibited by certain other polymeric materials which have not heretofore been used as materials for optical lenses and haptics therefore and that such materials having the essential characteristics of surface passivated polymeric material are thus also especially suitable materials for optical lens and haptics.

The present invention therefore relates to improvements in optical lenses such as contact lenses, intraoccular lenses, intracorneal implants and the like, to haptics for intraoccular lenses and to intraoccular lenses containing haptics either secured thereto or integral therewith.

The property of biological inertness is highly desired in optical lenses. Since optical lenses come in contact with surrounding biological tissue, inflammation or other deterioration of the tissue can result from lack of biological inertness or ragged or uneven surfaces. Low surface energy is also an advantage for such lens materials as it renders the material more biocompatable. My invention results in the production of optical lenses and haptics therefore as above described which are substantially free of the adverse effects resulting from materials heretofore used.

More particularly, my invention resides in a transparent polymeric optical lens body wherein all surfaces of the lens body are substantially biologically inert to occular tissue, all surfaces of the lens body are substantially free of surface defects when viewed through a 10 power optical microscope, the lens body has a contact angle with water of at least 85°, a contact angle with glycerol of at least 75° and a surface energy less than 30 erg/cm$^2$.

According to another embodiment of my invention, the polymer has at least one ester group on a side chain of the repeating unit and the repeating unit does not have any hydroxyl or amino groups.

The polymeric material can be a polymer of an alkyl acrylate or alkyl methacrylate. A preferred polymeric material is polymethylmethacrylate (PMMA). The polymeric material can also be polypropylene or a material selected from the group consisting of a polyether, a vinyl aromatic and a polyurethane.

According to a further embodiment of the present invention, the polymer is trifluoroethyl methacrylate, perfluorooctyl methacrylate, a fluorinated styrene or a fluorinated polycarbonate.

According to a further preferred embodiment of the present invention, the contact angle of the polymeric material of the lens body with water is at least 87° preferably at least 89°.

According to a further embodiment of the present invention, the contact angle of the polymeric material of the lens body with glycerol is at least 77° preferably at least 78°.

According to a further embodiment of the present invention, the surface energy of the polymeric material of the lens body is less than 25 erg/cm$^2$.

According to a further embodiment of my invention, an alkyl acrylate, an alkyl methacrylate, for example, polymethylmethacrylate (PMMA), polypropylene and polyethers, vinyl aromatics and polyurethanes are per se novel substances when they are rendered biologically inert to occular tissue, when all surfaces are substantially free of surface defects when viewed through a 10 power optical microscope, when the contact angle of the material with water is at least 85°, the contact angle with glycerol is at least 75° and the surface energy less than 30 erg/cm$^2$.

According to a further embodiment of my invention, a transparent polymeric optical lens body having two polymeric haptics or more than two polymeric haptics if desired each of which extends outwardly from the lens body in a configuration known in the art is produced wherein all surfaces of the lens body and the haptics are substantially biologically inert to occular tissue, all surfaces of the lens body and the haptics are substantially free of surface defects when viewed through a 10 power optical microscope, the lens body and each of the haptics has a contact angle with water of at least 85°, a contact angle with glycerol of at least 75° and a surface energy less than 30 erg/cm$^2$. The polymeric material can be a polymer of an alkyl acrylate or alkyl methacrylate. A preferred polymeric material is polymethylmethacrylate (PMMA). The polymeric material can also be polypropylene or a material selected from the group consisting of a polyether, a vinyl aromatic and a polyurethane.

According to a further embodiment of my invention, the contact angle with water is at least 87°, particularly at least 89° the contact angle with glycerol is at least 77°, particularly at least 78° and the surface energy is less than 25 erg/cm$^2$.

According to a further embodiment of my invention, a polymeric haptic suitable for attachment to an optical lens body is produced wherein all surfaces of the haptic are substantially biologically inert to occular tissue, all surfaces of the haptic are substantially free of surface defects when viewed through a 10 power optical microscope, the haptic has a contact angle with water of at least 85°, a contact angle with glycerol of at least 75° and a surface energy less than 30 erg/cm$^2$. The polymeric material polymer of an alkyl acrylate or alkyl methacrylate. The polymeric material can also be polymethylmethacrylate (PMMA), polypropylene or a material selected from the group consisting of a polyether, a vinyl aromatic and a polyurethane.

According to my invention, acrylic polymers such as alkyl acrylates or alkyl methacrylates such as PMMA or polyproplyene are rendered novel materials by surface passivating them as hereinafter described so that they possess the aforesaid characteristics.

According to a further embodiment of my invention, polyethers, vinyl aromatic compounds, polyurethanes, polymers having at least one ester group on a side chain of the repeating unit wherein the repeating unit does not have any hydroxyl or amino groups and such materials as trifluoroethyl methacrylate, perfluorooctyl methacrylate, fluorinated styrene and fluorinated polycarbonates having the characteristics according to my invention may be used for optical lenses whereas heretofore they could not have been because of lack of biological inertness, surface defects and/or a surface energy level too high to make them suitable for such use.

According to further embodiments of my invention, the contact angle with water is at least 87°, particularly at least 89° the contact angle with glycerol is at least 77°, particularly at least 78° and the surface energy is less than 25 erg/cm$^2$.

The manner in which the contact angle with water and the contact angle with glycerol of a material is measured is well known in the art as is the manner in which surface energy is measured in erg/cm$^2$. The prior art procedures for making those measurements are utilizable in determining whether or not a material has the characteristics which form part of my invention.

According to a further embodiment of my invention, I have developed a process for surface passivating acrylic polymers and copolymers and polypropylene so that they will possess the characteristics which are the essential aspect of my invention. When these materials are surface passivated to possess these characteristics they are particularly used in the production of optical lenses, haptics or lenses having haptics secured thereto or integral therewith. Before surface passivating these materials it is important to start with materials having a high surface quality, a low root mean square (RMS) variation in surface quality. This is generally achieved by tumble polishing the materials before final processing. Thereafter, my process can be considered as subdivided into an initial step which prepares the surface for surface passivation followed by the passivating step itself.

The lenses, haptics, and lenses with the haptics are placed in a suitable holder (surface passivation device) and immersed in a suitable preparative material such as a 30% anhydrous methanol in tetramethylammoniumhydroxide (TMAH) at room temperature. Such a solution is particularly suitable for treating PMMA. When n-butylacrylate is treated one can use tetrabutylammoniumhydroxide in place of the TMAH.

It is preferred that the solution be filtered before the materials to be treated are immersed therein to remove any residue in the solution. Following initial immersion in this solution, the materials are then removed and washed with deionized water. Then they are dried in an oven, such as a convection oven, preferably by ramping the temperature from room temperature to 50° C. Ramping is used to avoid deformation of the loops or haptics if they are present as or with the material being treated.

The drying step additionally drives off all volatile organic materials such as the TMAH and the methanol.

While the samples are still warm, they are placed in a desiccator and left to cool. Then they are surface passivated.

A suitable passivating agent prepared by adding perfluorodecanoic acid (PFDA) to Dow Corning's Z-6020 which is a trialkoxyaminosilane. It is generally preferred to add the Z-6020 to methanol and then add that solution to PFDA in methanol. Z-6020 when exposed to moisture hydrolyzers generating methanol. While Z-6020 is a trademark of Dow Corning, it is believed that it is N-($\beta$-aminoethyl)—aminopropyltrimethoxysilane.

The surface passivating agent should be one which contains an alkylamine organic group and a trimethoxysilyl inorganic group.

The solution of surface passivating agent is then heated to reflux and during reflux purged with nitrogen. Then a small amount of deionized water is added to the surface passivating agent solution. The solution is pressured filtered to remove any solid particles.

The material to be surface passivated is then immersed a sufficient number of times to ensure that all surfaces are properly exposed and have an opportunity to come in full contact with the surface passivating agent solution. Generally, 5 to 10 times is sufficient. Then the material to be surfaced passivated is left immersed in the surface passivating agent solution preferably at room temperature for several hours.

The material which is thus surface passivated is removed and washed, for example, in pure methanol and then dried in an oven using ramping from 30° C. to 50° C. After the temperature reaches 50° C. the oven is turned back down to room temperature. The surface passivated materials are then removed, placed in a desiccator and when cooled removed and examined under a 10 power microscope for surface pits and other irregularities. If there are haptics or loops these are examined and measurements can be taken of the contact angles of the materials in water and glycerol and the surface energy can be measured by techniques per se known.

The biological inertness of the outermost surface of the optical lens bodies passivated by the above described process was examined as described below. An acute corneal touch study on cats was performed at the Dean McGee Eye Institute, University of Oklahoma, using surface passivated intraoccular lenses and comparing them with identical intraoccular lenses which were not surface passivated (control lenses). The results of the study is set forth in Table 1 wherein the data is expressed in terms of area of cell damage in square microns measured by a scanning electron microscope (SEM). Based upon this study, the Dean McGee Eye Institute concluded that "the test lenses showed significant improvement compared with the control lenses."

TABLE 1

Scanning electronic microscopic analysis of the damage to endothelial cells in an acute corneal touch study on cat models.

| Cat No. | Area of Damage (Square Microns) | Lens Code |
|---|---|---|
| 1 | 3.7 × 10$^6$ | Control |
| 1 | 2.5 × 10$^5$ | Surface Modified |
| 2 | 6.2 × 10$^6$ | Control |
| 2 | 5.0 × 10$^5$ | Surface Modified |
| 3 | 2.3 × 10$^6$ | Control |
| 3 | 2.5 × 10$^5$ | Surface Modified |
| 4 | 3.4 × 10$^6$ | Control |
| 4 | 3.2 × 10$^5$ | Surface Modified |
| 5 | 2.6 × 10$^6$ | Control |

The following example more particularly illustrates the process of surface passivation according to my invention.

EXAMPLE

Intraoccular lenses (IOLs) made of PMMA having two haptics attached thereto and extending outwardly therefrom in a known configuration were tumble polished to render the surface of high quality and to provide a low RMS variation and surface quality. These were placed in a surface passivating device which comprises a holder for the lenses and their haptics and a cover. The device has holes through both the holder and the cover. A convenient size for the device is 25 centimeters which holds about 62 lenses (IOLs). The holder and cover has 7 holes evenly distributed over an area of 165 sq. mm, the area of the holes being 69 sq. mm thereby providing an adequate flow rate of solution over the lens surfaces.

Next, a solution of 30% anhydrous methanol in TMAH was prepared. The solution was filtered through a 0.2 micron filter to remove any residue. The surface passivating device which contained the IOLs was then immersed in the solution and withdrawn three times. This procedure takes approximately five minutes. This was to ensure that all of the surfaces of the IOLs came in contact with the solution. Then the surface passivating device was immersed in the solution and left for 30 minutes at room temperature.

The surface passivating device was removed and washed by immersion in deionized water three times each washing taking approximately five minutes.

Then the cover of the device was removed leaving the holder containing the IOLs which was then placed in a forced air convection oven. They remained at room temperature in the oven for five minutes and then the temperature was raised to 50° C. over a three minute period by:

a) raising the temperature to 30° C. and drying for 15 minutes;
b) raising the temperature to 35° C. and drying for five minutes;
c) raising the temperature to 40° C. and drying for five minutes;
d) raising the temperature to 45° C. and drying for five minutes; and
e) raising the temperature to 50° C. and drying for five minutes.

This is called ramping. The oven reaches the next higher temperature relatively rapidly. This procedure is important in order to avoid deformation of loops or haptics if the IOLs have them.

The drying technique appears to drive off all volatile organic material. Thus, it is believed that the TMAH and the methanol are driven off. It may be that water bonds to the surfaces of the IOLs and haptics but I am not sure of the precise mechanism.

Then the oven temperature is turned down to room temperature and it remains thus for a few minutes with the holder in the oven at room temperature. While the holder and IOLs are still warm, they are removed from the oven and placed in a desiccator and left to cool for about 10 minutes. A preferred desiccator is anhydrous calcium sulphate which is sold under the trademark Drie rite.

Then the holder is removed from the desiccator, the cover is put back on and the device is immersed in the surface passivating agent solution. This solution is made up by taking Dow Corning Z-6020, adding it to a methanol to form a solution having a concentration of $5 \times 10^2$ m/l to $1 \times 10^4$ m/l and then adding that to an equimolar concentration of PFDA in methanol. This solution is then heated to reflux temperature which is about 65° C. and the solution is refluxed for four hours during which time it is purged with nitrogen and stirred with a magnetic stirrer. The purging is accomplished by bubbling nitrogen through the surface passivating agent solution in a conventional manner.

Then 1% by volume deionized water is added to the surface passivating agent solution and the solution is pressure filtered through a 0.2 micron filter under about 25 to 30 psi pressure in order to remove solid particles.

The surface passivating device containing the IOLs is then immersed in the surface passivating solution five to 10 times. This is to ensure that the material to be surface passivated comes in full and complete contact with the surface passivating solution. Immersion at least five times is generally sufficient.

Then the surface passivating device is left immersed in the surface passivating agent solution for four hours at room temperature. The surface passivating device is then removed and washed in pure methanol twice for approximately five minutes each time. This is conveniently done by immersion. Then the cover is removed and the surface passivating holder containing the IOLs is placed in the same type of convection oven and dried using the following ramping procedure:

a) 45 minutes as 30° C.;
b) 15 minutes at 35° C.;
c) 10 minutes at 40° C.;
d) 10 minutes at 45° C.; and
e) 10 minutes at 50° C.

After the drying step at 50° C. is completed, the oven is turned down to room temperature. The surface passivating device with the IOLs still warm is removed from the oven and placed in a desiccator of the type above described for about 10 minutes. The surface passivating device is then removed and each IOL is examined under a 10 power microscope for surface defects and to ensure that if there are loops or haptics on the IOLs that the loops have not been distorted or the angles changed. Measurement of the angle in water and glycerol shows that the surface passivated materials have a contact angle in water of at least 85° and a contact angle in glycerol of at least 75° and a surface energy less than 30 erg/cm². All surfaces were found to be substantially free of surface defects when viewed through a 10 power optical microscope. The contact angle of the surfaces with water was found to be 90°±1°.

What is claimed is:

1. In a transport polymeric optical lens body, the improvement wherein all surfaces of the lens body are substantially biologically inert to occular tissue, all surfaces of the lens are substantially free of surface defects when viewed through a 10 power optical microscope, wherein said improvement is produced by a method of surface passivation comprising:

(a) hydrogen bonding water molecules to polymer chains at the outermost surface of the lens body in order to render the surface wettable by a silane passivating reagent, wherein said hydrogen bonding is accomplished by immersing the acrylic lens body in a strong organic base, washing the immersed lens body with dionized water and drying the washed lens body; and (b) immersing the lens body in a silane passivating reagent reactive to water molecules to in order attract and remove the water molecules from the outermost surface leaving the surface with a smoother more regular morphology, and after immersion in said reagent, washing the immersed lens body and then drying the washed lens body in an oven by ramping.

2. The improvement according to claim 1 wherein the polymeric material of the lens body has at least one ester group on a side chain of the repeating unit and the repeating unit does not have any hydroxyl or amino groups.

3. The improvement according to claim 1 wherein the polymeric material of the lens body is a polymer of an alkyl acrylate or an alkyl methacrylate.

4. The improvement according to claim 1 wherein the polymeric material of the lens body is polymethylmethacrylate.

5. The improvement according to claim 1 wherein the polymeric material of the lens body is polypropylene.

6. The improvement according to claim 1 wherein the polymeric material of the lens body is selected from the group consisting of a polyether, a vinyl aromatic, and a polyurethane.

7. The improvement according to claim 1 wherein the polymer of the lens body is trifluoroethyl methacrylate, perfluorooctyl methacrylate, a fluorinated styrene or a fluorinated polycarbonate.

8. The improvement according to claim 1 wherein the contact angle with water is at least 87°.

9. The improvement according to claim 1 wherein the contact angle with water is at least 89°.

10. The improvement according to claim 1 wherein the contact angle with glycerol is at least 75°.

11. The improvement according to claim 1 wherein the contact angle with glycerol is at least 77°.

12. The improvement according to claim 1 wherein the surface energy is less than 25 erg/cm$^2$.

13. A polymeric material which comprises a polymer or copolymer of an alkyl acrylate or an alkyl methacrylate or polypropylene wherein all surfaces of the polymeric material are substantially biologically inert to ocular tissue, all surfaces of the material are substantially free of surface defects when viewed through a 10 power optical microscope, wherein said improvement is produced by a method of surface passivation comprising:

(a) hydrogen bonding water molecules to polymer chains at the outermost surface of the lens body in order to render the surface wettable by a silane passivating reagent, wherein said hydrogen bonding is accomplished by immersing the acrylic lens body in a strong organic base, washing the immersed lens body with dionized water and drying the washed lens body; and (b) immersing the lens body in a silane passivating reagent reactive to water molecules in order to attract and remove the water molecules from the outermost surface leaving the surface with a smoother more regular morphology, and after immersion in said reagent, washing the immersed lens body and then drying the washed lens body in an oven by ramping.

14. A polymeric material according to claim 13 wherein the polymer has at least one ester group on a side chain of the repeating unit and the repeating unit does not have any hydroxyl or amino groups.

15. A polymeric material according to claim 13 wherein the polymeric material is a polymer of an alkyl acrylate or an alkyl methacrylate.

16. A polymeric material according to claim 13 wherein the polymeric material is polymethylmethacrylate.

17. A polymeric material according to claim 13 wherein the polymeric material of the lens body is polypropylene.

18. A polymeric material according to claim 13 wherein the contact angle with water is at least 87°.

19. A polymeric material according to claim 13 wherein the contact angle with water is at least 89°.

20. A polymeric material according to claim 13 wherein the contact angle with glycerol is at least 75°.

21. A polymeric material according to claim 13 wherein the contact angle with glycerol is at least 77°.

22. A polymeric material according to claim 13 wherein the surface energy is less than 25 erg/cm$^2$.

23. The improvement according to claim 1, wherein the strong organic base is a tetraalkyl ammonium hydroxide.

24. The improvement according to claim 1, wherein the silane passivating reagent is a trialkoxyamino silane.

25. A polymeric material according to claim 13, wherein the strong organic base is a tetraalkyl ammonium hydroxide.

26. A polymeric material according to claim 13, wherein the silane passivating reagent is a trialkoxyamino silane.

* * * * *